United States Patent Office 3,268,711
Patented August 23, 1966

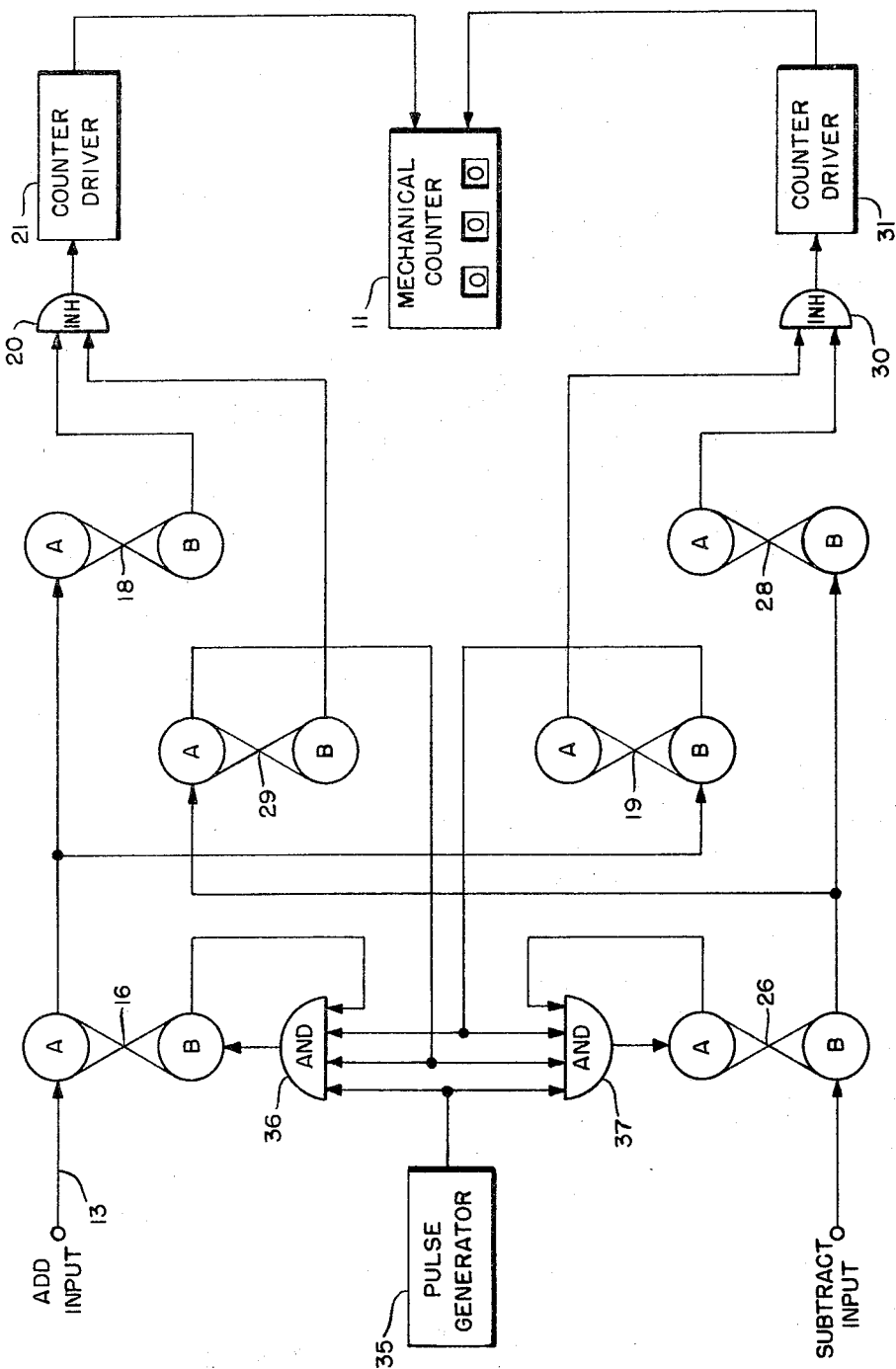

3,268,711
MECHANICAL COUNTER COINCIDENCE CIRCUIT
John C. Tirrell, Mount Prospect, Ill., assignor to Teletype Corporation, Skokie, Ill., a corporation of Delaware
Filed Nov. 21, 1962, Ser. No. 239,290
4 Claims. (Cl. 235—92)

This invention relates to coincidence circuits for controlling the transmission of input pulses to a mechanical counter and more specifically to a circuit for converting a mechanical counter into a differential counter.

In many operations, such as teletypewriter message counter operations, a mechanical counter circuit is utilized which must be capable of receiving pulses to be added and pulses to be subtracted in the same operation. It is desirable to cancel out pulses received at substantially the same time to prevent wear of the mechanical counter parts so that the useful life thereof is increased. Therefore, control circuitry must be provided which operates to negate the effect of input pulses received at substantially the same time so that the pulses are effectively cancelled out and the mechanical counter is not required to operate. Since a specific period of time is required for the mechanical counter to operate in response to an input pulse, the control circuitry must also operate to transmit input pulses not received at substantially the same time to a counter operating circuit at least a predetermined time period apart.

An object of this invention is to provide a new and improved coincidence circuit for increasing the useful life of a reversible mechanical counter.

Another object of this invention is to provide a new and improved counter coincidence circuit for cancelling out the effect of input pulses received at substantially the same time.

An additional object of this invention is to provide new and improved counter coincidence circuit for causing input pulses not received at substantially the same time to be transmitted to a counter operating circuit at least a predetermined time period apart.

A further object of this invention is to provide a new, improved, simple and economical coincidence circuit for a reversible mechanical counter.

With these and other objects in mind, the present invention relates to a coincidence circuit for a reversible mechanical counter capable of adding and subtracting input pulses applied thereto. An example of one type of counter with which this invention may be used is shown in United States Patent No. 2,441,207 issued May 11, 1948 to L. M. Potts. A pair of input conductors are provided into which input pulses are transmitted and a storage device is associated with each input conductor so that an input pulse transmitted over one of the conductors is independently stored in the storage device associated therewith. A cyclically operable read-out device is provided for reading out pulses stored in the storage devices. Counter operating circuitry responds to the pulses read out from the storage devices to drive the mechanical counter in an adding direction or a subtracting direction. Control circuitry is provided which also is responsive to a pulse read out from a storage device for preventing operation of the counter operating circuitry, in response to a pulse read out from the other storage device, for a predetermined period of time and for preventing operation of the cyclically operable read-out device for a predetermined period of time.

Other objects, advantages and features of the invention will become apparent by reference to the following description and the drawing wherein a schematic diagram of a preferred embodiment of a coincidence circuit for controlling the transmission of input pulses to a mechanical counter is illustrated.

A plurality of flip-flops, inhibit gates and "AND" gates are utilized in a coincidence circuit as illustrated in the drawing. Since these circuit components are common in the art, they are illustrated symbolically, as described below, rather in detailed form.

The flip-flops are illustrated as a pair of circles interconnected by a pair of lines crossed in an "X" configuration, each circle representing an active element of the flip-flop and its associated circuitry. An input to a control electrode of one of the active flip-flop elements is illustrated by a line connected directly to the left side, top or bottom of the circle representing the particular active element. An output from an active flip-flop element is illustrated by a line connected to the right side of the circle representing the particular active element.

The flip-flops are either bistable devices or monostable devices and are so designed that, at any given time, one of the active elements is operative (conductive) and the other active element is nonoperative (nonconductive). When an active element is rendered nonoperative, the potential of the output thereof drops in value and, when an active element is rendered operative, the potential of the output thereof rises in value.

If an input signal or pulse is applied to a control electrode of an operative active element of a bistable flip-flop, that active element is rendered nonoperative and the other active element is rendered operative until a subsequent input signal or pulse is applied to the control electrode of the other active element. If an input signal or pulse is applied to a control electrode of an operative active element of a monostable flip-flop, the active element is rendered nonoperative and the other active element is rendered operative until a predetermined time period thereafter when the active elements return to their original conditions.

The "AND" gates are illustrated as half circles labeled with the word "AND," and the inhibit gates are illustrated as half circles labeled with the letters "INH."

Referring to the drawing, there is shown a coincidence circuit for controlling the transmission of input pulses to a reversible mechanical counter 11, so that input pulses received at substantially the same time in a pair of input conductors 13 and 14 are cancelled out and, at least, a predetermined time interval is provided between the transmission to the counter 11 of input pulses not received at substantially the same time in the input conductors 13 and 14. In the specific embodiment illustrated the input conductor 13 is provided for the transmission of input pulses to be added in the counter 11 and the input conductor 14 is provided for the transmission of input pulses to be subtracted in the counter 11.

Input pulses applied to the input conductor 13 are transmitted to the control electrode of active element A of a storage flip-flop 16. In response to the application thereto of an input pulse, active element A of the storage flip-flop 16 is rendered non-operative and active element B of the storage flip-flop 16 is rendered operative so that the output of element B rises in potential to provide an output signal. This is the set condition of the storage flip-flop 16 when an input pulse is stored therein. Subsequently when a reset signal is applied to the control electrode of active element B of the storage flip-flop 16, active element B is rendered nonoperative and active element A is rendered operative so that the output of element A rises in potential to provide an output signal. This is the reset condition of the storage flip-flop 16 when a stored input pulse is read out therefrom.

The output signal of active element A of the storage flip-flop 16 is transmitted to active element A of a monostable control flip-flop 18 (active element A thereof normally operative) and to active element B of a monostable control flip-flop or regulating flip-flop 19 (active element B thereof normally operative) so that these active elements are rendered nonoperative and the other active elements of these monostable control flip-flops are rendered operative. A predetermined time period thereafter, preferably 40 milliseconds in the illustrated embodiment, the monostable control flip-flop 18 returns to its original condition such that active element A is rendered operative and active element B is rendered nonoperative. Also, a predetermined time period thereafter which is greater than the time period of the monostable control flip-flop 18, preferably 80 milliseconds in the illustrated embodiment, the monostable control flip-flop 19 returns to its original condition such that active element B is rendered operative and active element A is rendered nonoperative.

During the time period between the rendering operative of the active element B of the monostable control flip-flop 18 and the subsequent rendering nonoperative thereof, an output pulse is provided thereby which is transmitted through an inhibit gate 20 to a counter driver 21. An input pulse is permitted to pass through the inhibit gate 20 only when no signal indicative of an input pulse received in the input conductor 14 is applied thereto, as will be described hereinafter. The counter driver 21 responds to an output pulse transmitted from active element B of the monostable control flip-flop 18 to drive the mechanical counter 11 in the adding direction so that the addition of an input pulse is indicated thereby. The output pulse from active element B of the monostable control flip-flop 18 has a predetermined time period so that sufficient time is provided for the counter 11 to be operated in the adding direction.

Input pulses, to control subtraction, are applied to the input conductor 14 and are transmitted to the control electrode of active element B of a storage flip-flop 26. In response to the application thereto of an input pulse, active element B of the storage flip-flop 26 is rendered nonoperative and active element A of the storage flip-flop 26 is rendered operative so that the output thereof rises in potential to provide an output signal from element A. This is the set condition of the storage flip-flop 26 when an input pulse is stored therein. Subsequently when a reset signal is applied to the control electrode of active element A of the storage flip-flop 26, active element A is rendered nonoperative and active element B is rendered operative so that the output of element B rises in potential to provide an output signal. This is the reset condition of the storage flip-flop 26 when a stored input pulse is read out therefrom.

The output signal of active element B of the storage flip-flop 26 is transmitted to active element B of a monostable control flip-flop 28 the active element B of which is normally operative, and to active element A of a monostable control or regulating flip-flop 29 the active element A of which is normally operative; so that the active element B of the flip-flop 28 and the active element A of the flip-flop 29 are rendered nonoperative and the active element A of the monostable control flip-flop 28 and the active element B of the monostable flip-flop 29 are rendered operative. A predetermined time period thereafter, preferably 40 milliseconds in the illustrated embodiment, the monostable control flip-flop 28 returns to its original condition such that its active element B is rendered operative and active element A is rendered nonoperative. Also, a predetermined time period thereafter which is greater than the time period for the monostable control flip-flop 28, preferably 80 milliseconds in the illustrated embodiment, the monostable control flip-flop 29 returns to its original condition such that active element A is rendered operative and active element B is rendered nonoperative.

During the time period between rendering operative of the active element A of the monostable control flip-flop 28 and the subsequent rendering nonoperative thereof, an output pulse is provided thereby which is transmitted through an inhibit gate 30 to a counter driver 31. An input pulse is permitted to pass through the inhibit gate 30 only when no signal indicative of an input pulse received in the input conductor 13 is applied thereto, as will be described hereinafter. The counter driver 31 responds to an output pulse transmitted from active element A of the monostable control flip-flop 18 through gate 30 to drive the mechanical counter 11 in the subtracting direction so that the subtraction of an input pulse is indicated thereby. The output pulse from active element A of the monostable control flip-flop 28 has a predetermined time period so that sufficient time is provided for the counter 11 to be operated in the subtracting direction.

During the period between the time when active element A of the monostable control flip-flop 19 is rendered operative and the time when it is again rendered nonoperative (preferably 80 miliseconds as previously set forth), an output pulse is applied from active element A of the flip-flop 19 to the inhibit gate 30 which prevents the passage of an output pulse from the monostable control flip-flop 28 to the counter driver 31. Thus, during the time period from the time when an output pulse is transmitted to the counter driver 21 until the monostable flip-flop 19 completes its cycle, an output pulse cannot be transmitted to the counter driver 31 and sufficient time is provided to operate the counter 11 in response to an input pulse received over the input conductor 13 and to allow the counter 11 to come to rest completely before a subsequent input pulse received over the input conductor 14 is permitted to cause operation of the counter 11.

During the time period between the time when active element B of the monostable control flip-flop 29 is rendered operative and the time when it is again rendered nonoperative (preferably 80 milliseconds as previously set forth), an output pulse is applied from active element B of the flip-flop 29 to the inhibit gate 20 which prevents the passage of an output pulse from the monostable control flip-flop 18 to the counter driver 21. Thus, from the time when an output pulse is transmitted to the counter driver 31 until the monostable flip-flop 29 completes its cycle, an output pulse cannot be transmitted to the counter driver 21 and sufficient time is provided to operate the counter 11 in response to an input pulse received over the input conductor 14 and to allow the counter 11 to come to rest completely before a subsequent input pulse received in the input conductor 13 is permitted to cause operation of the counter 11.

A free running pulse generator 35 is provided for controlling the time of resetting of the bistable storage flip-flops 16 and 26. The pulse generator 35 generates output pulses at preset time intervals (preferably at 10 millisecond intervals) which are less than the time periods of the monostable control flip-flops 19 and 29. The output of the pulse generator 35 is connected to "AND" gates 36 and 37 which are respectively associated with the bistable storage flip-flops 16 and 26.

The output from active element B of the bistable storage flip-flop 16, the output from active element A of the monostable control flip-flop 29 and the output from active element B of the monostable control flip-flop 19 are also connected to the "AND" gate 36. If (1) active element A of the monostable control flip-flop 29 is operative, (2) active element B of the monostable control flip-flop 19 is operative, (3) active element B of the bistable storage flip-flop 16 is operative and (4) an output pulse is provided by the pulse generator 35, a reset signal is transmitted from the "AND" gate 36 to active element B of the bistable storage flip-flop 16 which causes the bistable storage flip-flop 16 to be reset so that an output signal is provided by active element A thereof.

If an output signal previously had been provided by active element B of the bistable storage flip-flop 26, active element A of the monostable control flip-flop 29 would be nonoperative and reset signals would not be transmitted from the "AND" gate 36 to active element B of the bistable storage flip-flop 16. Thus, in addition to preventing the transmission of an output signal from the monostable control flip-flop 18 to the counter driver 21, the monostable control flip-flop 29 operates to prevent resetting of the bistable storage flip-flop 16 for a predetermined period of time. As set forth below, the output from active element B of the monostable control flip-flop 29 is also connected to the "AND" gate 37 and the monostable control flip-flop 29 also operates to prevent resetting of the bistable storage flip-flop 26 for a predetermined period of time.

The output from active element A of the bistable storage flip-flop 26, the output from active element A of the monostable control flip-flop 29 and the output from active element B of the monostable control flip-flop 19 are also connected to the "AND" gate 37. If (1) active element A of the monostable control flip-flop 29 is operative, (2) active element B of the monostable control flip-flop 19 is operative, (3) active element A of the bistable storage flip-flop 26 is operative and (4) an output pulse is provided by the pulse generator 35, a reset signal is transmitted from the "AND" gate 37 to active element A of the bistable storage flip-flop 26 which causes the bistable storage flip-flop 26 to be reset so that an output signal is provided by active element B thereof.

If an output signal previously had been provided by active element A of the bistable storage flip-flop 16, active element B of the monostable control flip-flop 19 would be nonoperative and reset signals would not be transmitted from the "AND" gates 37 and 36 to active element A of the bistable storage flip-flop 26 and active element B of the bistable storage flip-flop 16. Thus, in addition to preventing the transmission of an output signal from the monostable control flip-flop 28 to the counter driver 31, the monostable control flip-flop 19 operates to prevent resetting of the bistable storage flip-flops 16 and 26 for a predetermined period of time equal in length to the time period of the control flip-flop 19 (preferably 80 milliseconds as stated previously).

Assuming that input pulses are transmitted over the input conductors 13 and/or 14 a time period apart such that an output pulse is provided by the pulse generator 35 between the transmission of the input pulses, the first input pulse transmitted causes the associated bistable storage flip-flop 16 or 26 to be placed in the set condition. In response to the output pulse of the pulse generator 35, the bistable storage flip-flop 16 or 26 is reset and an output signal is provided thereby. In response to the output signal, the associated monostable control flip-flop 18 or 28 operates to apply a pulse to the associated counter driver 21 or 31 which drives the mechanical counter 11 in the adding or subtracting direction. Also, in response to the output signal, the associated monostable control flip-flop 19 or 29 operates for a predetermined period of time to prevent the resetting of the bistable storage flip-flops 16 and 26 and to prevent the transmission of a pulse from the other monostable control flip-flop 28 or 18 to the other counter driver 31 or 21.

When the second input pulse is subsequently transmitted over an input conductor, the associated bistable storage flip-flop 26 or 16 is caused to be placed in the set condition. The next output pulse of the pulse generator 35 which occurs after the previously operated monostable control flip-flop 19 or 29 has ceased operating to prevent resetting of the bistable storage flip-flops 16 and 26 resets the bistable storage flip-flop 26 or 16 and an output signal is provided thereby which causes a similar cycle of operation to taken place as the cycle of operation responding to the output signal of the bistable storage flip-flop 16 or 26 which was explained in the previous paragraph.

Thus, it may be seen that the coincidence circuit operates to control the transmission of sequentially received input pulses to the counter 11 so that the counter is provided sufficient time to operate in response to each input pulse and the circuit allows two input pulses on the same or different input leads spaced closely together in time to be applied to the counter 11 when an output pulse from the pulse generator 35 occurs between them.

Assuming that an input pulse is transmitted over each of the input conductors 13 and 14 such that a reset pulse is not provided by the generator 35 between the transmission of the input pulses but rather after the transmission of both of the input pulses, both the bistable storage flip-flops 16 and 26 are caused to be placed in the set conditions. In response to the next output pulse of the pulse generator 35 passed by the gates 36 and 37, both of the bistable storage flip-flops 16 and 26 are reset and output signals are provided thereby. In response to the output signals, the monostable control flip-flops 19 and 29 both operate for a predetermined period of time to prevent the resetting of the bistable storage flip-flops 16 and 26 and to prevent the transmission of pulses from the monostable control flip-flops 18 and 28 to the counter drivers 21 and 31. Also, in response to the output signals from the bistable flip-flops 16 and 26, the monostable control flip-flops 18 and 28 both operate to provide output pulses, but these output pulses are rendered ineffective by operation of the monostable control flip-flops 19 and 29 which cause the gates 20 and 30 to block the output pulses from the flip-flops 18 and 28. Since the periods of operation of the control flip-flops 19 and 29 are greater than the periods of operation of the control flip-flops 18 and 28, input pulses received at substantially the same time on both lines 13 and 14 are effectively cancelled out. It is to be noted that any input pulse transmitted over conductor 13 and any input pulse transmitted over conductor 14 which are applied to the flip-flops 16 and 26 without having a reset pulse applied to those flip-flops between the two different input pulses are considered to be received at the same or substantially the same time.

The application of the output of active element B of the flip-flop 16 and of the output of active element A of the flip-flop 26 to the "AND" gates 36 and 37, respectively, is to ensure that the flip-flops 16 and 26 are fully set before a reset pulse can be applied to them through the gates 36 and 37. This prevents the possibility of faulty operation when an input pulse and a reset pulse occur simultaneously.

Thus, it may be seen that a coincidence circuit has been provided for controlling the transmission of sequentially received input pulses to a mechanical counter and for cancelling out the effect of add and subtract input pulses received at substantially the same time.

While one specific embodiment of the invention has been described in detail, it will be obvious that various modifications may be made differing from the specific details described without departing from the spirit and scope of the invention.

What is claimed is:

1. A coincidence circuit for a reversible counter capable of adding and subtracting input pulses applied thereto, which comprises:
   (a) a pair of input conductors over which input pulses are transmitted, one conductor being provided for input pulses to be added and the other conductor being provided for input pulses to be subtracted;
   (b) a pair of storage devices, each storage device being associated with one of the input conductors so that input pulses are independently stored therein;
   (c) cyclically operable readout means for reading out pulses stored in the two storage devices;
   (d) counter operating means responsive to a pulse read out from the storage device wherein pulses to be added are stored for driving the counter in an adding direction and responsive to a pulse read out from the storage device wherein pulses to be subtracted are stored for driving the counter in a subtracting direction, and (e) control means responsive to a pulse read out from one storage device for preventing operation of the counter operating means in response to a pulse read out from the other storage device for a predetermined period of time so that sufficient time is provided for the counter to be operated and responsive to pulses simultaneously read out from the two storage device for negating the effect of the counter operating means so that input pulses received at substantially the same time are cancelled out.

2. A coincidence circuit for a reversible counter capable of adding and subtracting input pulses applied thereto, which comprises:

(a) a pair of input conductors over which input pulses are transmitted, one conductor being provided for input pulses to be added and the other conductor being provided for input pulses to be subtracted;

(b) a pair of bistable storage devices, each bistable storage device being associated with one of the input conductors and being driven from a primary stable state to a secondary stable state in response to the transmission of an input in the associated input conductor;

(c) a pair of control signal conductors, each control signal conductor being so associated with one of the bistable storage devices than an output signal representative of a previously received input pulse is produced therein when the associated bistable storage device is driven from the secondary stable state to the primary stable state;

(d) cyclically operable means for applying pulses to each bistable storage device that has attained the secondary stable state which causes the bistable storage device to be driven back to the primary stable state;

(e) a pair of monostable control devices, each monostable control device being associated with one of the control signal conductors and being driven from a stable state to a nonstable state in response to the production of an output signal in the associated conductor, each monostable control device automatically returning to the stable state a predetermined time period after being driven to the nonstable state and an output pulse being provided by each monostable control device while it is in the nonstable state;

(f) counter operating means responsive to an output pulse from one of the monostable control devices for operating the counter in an adding direction so that the addition of a pulse is indicated thereby and responsive to an output pulse from the other monostable control device for operating the counter in a subtracting direction so that the subtraction of a pulse is indicated thereby, and (g) control means responsive to an output signal produced in either of the control signal conductors for preventing the application of a pulse from the cyclically operable means to the bistable storage devices for a predetermined period of time and for preventing operation of the counter operating means in response to the production of an output signal in the other control signal conductor for a predetermined period of time so that sufficient time is provided for operation of the counter, the preventing time period of the control means being greater than the time periods of the monostable control devices so that the control means operates to negate the effect of input pulses received in the input conductors at substantially the same time.

3. The coincidence circuit as recited in claim 2 wherein the control means includes:

(a) a pair of monostable regulating devices, each monostable regulating device being associated with one of the control signal conductors and being driven from a stable state to a nonstable state in response to the production of an output signal in the associated conductor, each monostable regulating device automatically returning to the stable state a predetermined time period after being driven to the nonstable state and the time period being greater than the time periods for the monostable control devices, an output pulse being provided by each monostable regulating device while it is in the nonstable state;

(b) a pair of gating devices, each gating device being associated with a monostable control device associated with one of the control signal conductors and a monostable regulating device associated with the other control signal conductor and being provided for controlling the transmission of output pulses from the associated monostable control device to the counter operating means, each gating device responding to an output pulse from the associated monostable regulating device for preventing transmission of an output pulse from the associated monostable control device to the counter operating means; and (c) means responsive to output pulses provided by the monostable regulating devices for preventing application of a pulse from the cyclically operable means to the bistable storage devices.

4. The coincidence circuit as recited in claim 3 wherein the bistable devices are bistable flip-flops and the monostable devices are monostable flip-flops.

References Cited by the Examiner
UNITED STATES PATENTS

| | | | |
|---|---|---|---|
| 2,813,678 | 11/1957 | Wilcox | 235—92 |
| 3,028,084 | 3/1962 | Weatherill | 235—92 |
| 3,108,226 | 10/1963 | Douglas | 235—92 |

OTHER REFERENCES

Pages 2074–2075, December 1960, "Bidirectional Counting" by Hupp, from "Instruments and Control Systems," vol. 33, No. 12.

MALCOLM A. MORRISON, *Primary Examiner.*

J. F. MILLER, *Assistant Examiner.*